United States Patent
Riesselmann et al.

(12) 
(10) Patent No.: US 6,361,083 B1
(45) Date of Patent: Mar. 26, 2002

(54) SCREW JOINT FOR PIPES

(75) Inventors: Franz-Josef Riesselmann, Lohne; Peter Braegelmann, Ochtrup, both of (DE)

(73) Assignee: Hewing GmbH, Ochtrup (DE)

(*) Notice: Subject to any disclaimer, the term of this patent is extended or adjusted under 35 U.S.C. 154(b) by 0 days.

(21) Appl. No.: 09/448,293

(22) Filed: Nov. 24, 1999

(30) Foreign Application Priority Data

Nov. 26, 1998 (DE) .......................................... 198 54 591

(51) Int. Cl.$^7$ ................................................ F16L 55/00
(52) U.S. Cl. ........................ 285/333; 285/355; 285/423
(58) Field of Search ................................ 285/333, 390, 285/355, 92, 423

(56) References Cited

U.S. PATENT DOCUMENTS

| | | | |
|---|---|---|---|
| 2,179,202 A | * 11/1939 | Simpson ...................... 285/355 |
| 2,545,263 A | * 3/1951 | Corydon, II ............. 285/423 X |
| 3,167,333 A | * 1/1965 | Hall et al. .................. 285/333 |
| 3,687,493 A | * 8/1972 | Lock et al. ................. 285/333 |
| 4,093,280 A | * 6/1978 | Yoshizawa et al. ..... 285/423 X |
| 4,500,118 A | * 2/1985 | Blenkush ................ 285/423 X |
| 4,537,426 A | * 8/1985 | Carter, Sr. ............... 285/423 X |
| 4,655,485 A | * 4/1987 | Albrecht et al. ............. 285/333 |
| 4,682,797 A | * 7/1987 | Hildner ................... 285/355 X |
| 5,106,130 A | * 4/1992 | Ellsworth et al. ........... 285/355 |
| 5,234,765 A | * 8/1993 | Taylor et al. ........... 285/423 X |
| 5,470,111 A | * 11/1995 | Nelson et al. .......... 285/333 X |
| 6,186,558 B1 | * 2/2001 | Komolrochanaporn .. 285/390 X |

FOREIGN PATENT DOCUMENTS

GB 2038977 * 1/1979 .................. 285/333

* cited by examiner

*Primary Examiner*—Lynne H. Browne
*Assistant Examiner*—David E. Bochna
(74) *Attorney, Agent, or Firm*—Birch, Stewart, Kolasch & Birch, LLP

(57) ABSTRACT

A screw joint for pipes, in particular sanitary and floor heating pipes of, for example, plastic material or a composite material of metal and plastics is provided with at least one screw joint member with a substantially cylindrical portion, in which a thread with at least one helical raised portion of, in particular, triangular cross section is formed. The at least one raised portion of the thread has a base section adjoining or located in the cylindrical portion and an end section radially adjoining the base section. Within at least a part of the course of the thread, at least the end section of the at least one raised portion is made of a material that is more elastic than the material of the cylindrical portion.

16 Claims, 3 Drawing Sheets

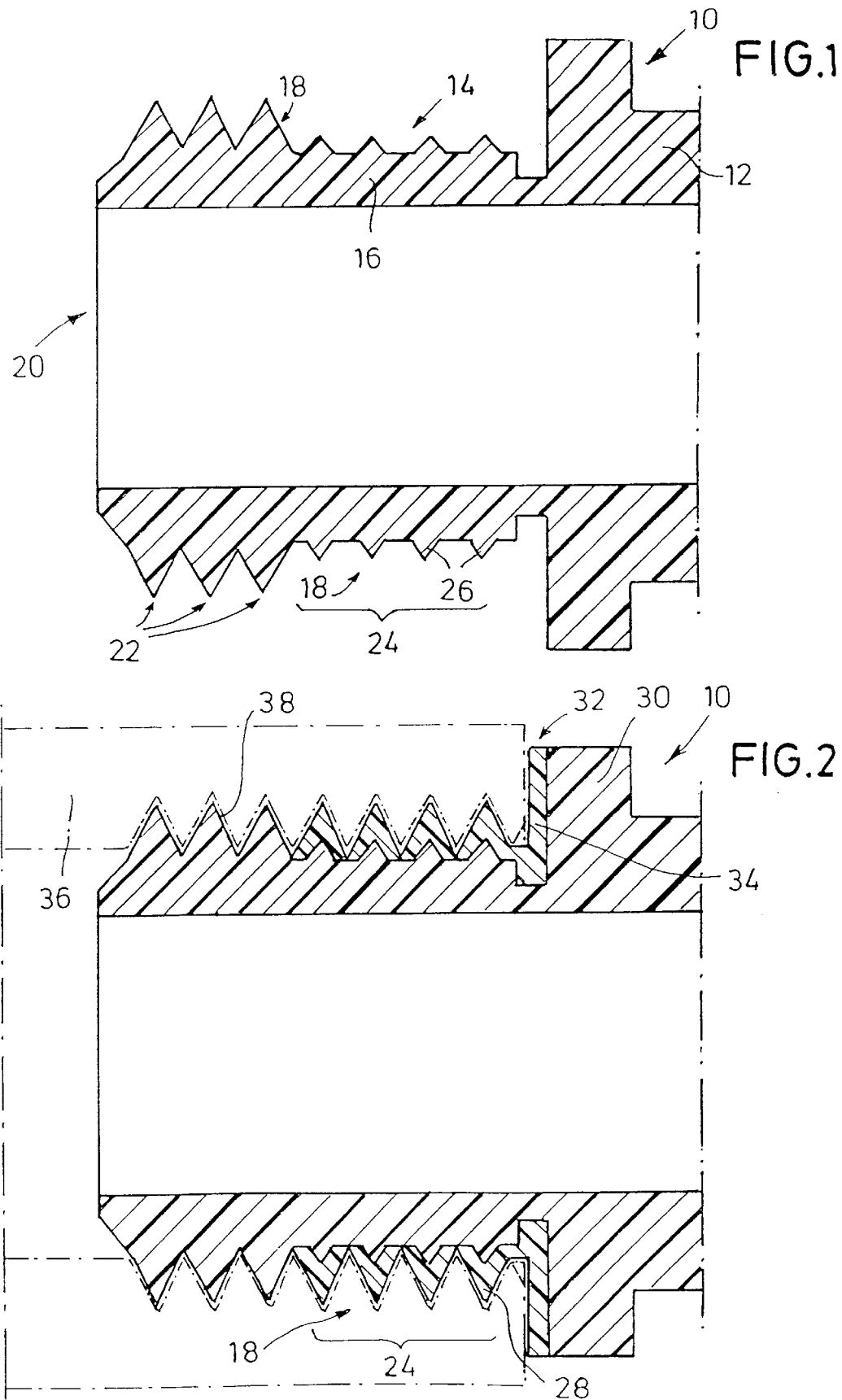

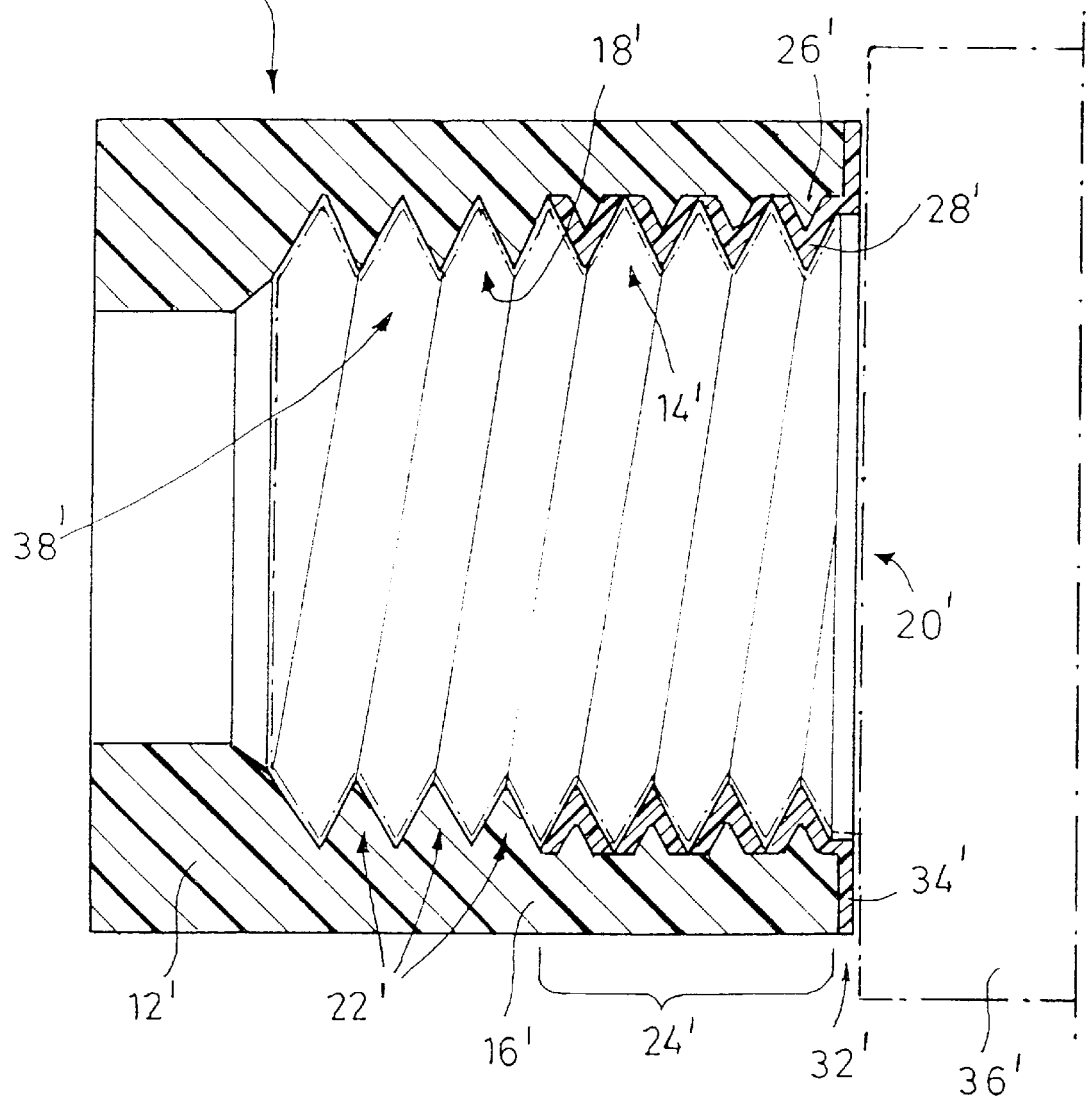

SCREW JOINT FOR PIPES

BACKGROUND OF THE INVENTION

The present invention relates to a screw joint for pipes, in particular sanitary and heating pipes of, for example, plastic material or a composite material of metal and plastics.

Screw joints for pipes are known per se and are generally made of metal. One example of a member used for a screw joint is a pipe connection fitting, the fitting body having an outer thread to connect the fitting with another element of the pipeline or a fitting. In this instant, the thread is meant to mechanically hold and connect the members of the screw joint. For sealing purposes, the thread of one member of the screw joint is fitted with hemp, a Teflon strip or similar sealing material, whereby a fluid-tight screwed joint is obtained after connection with the opposite member of the screw joint.

Recently, increased efforts have been made to produce screw joint members such as fittings, from plastic materials. Plastic fittings are advantageous over metal fittings in that they are considerably more resistant to corrosion. However, there are problems in sealing screw joints formed by two plastic members of a screw joint in threaded engagement. Other than metal, plastic material has a lower stress resistance so that upon screwing together plastic fitting members provided with sealing material, there is a danger of fissures occurring in the fittings members due to the increased radial mechanical tensions.

German Utility Model 74 09 347 discloses an outer connection thread with a seal for a fitting as defined in the precharacterizing part of claim 1. This fitting has a metal thread with a circumferential groove in its axial center portion, a plastic ring insert with an outer thread being located in the groove. The radial inside of the ring insert abuts the bottom of the groove. The outer thread of the ring insert projects beyond the outer thread of the fitting.

SUMMARY OF THE INVENTION

It is the object of the invention to provide a screw joint member, in particular of plastic material, for pipes that meets both the mechanical and the sealing requirements for screw joints so that the risk of damage to screwed fitting members is reduced.

According to the invention, the object is solved with a screw joint, in particular of plastic material, for pipes, preferably sanitary or heating pipes of, e.g., plastic material or a metal-plastics composite material, comprising at least one screw joint member with a substantially cylindrical portion provided with a thread having at least one helically extending raised portion, in particular with a substantially triangular cross section, wherein the at least one raised portion of the thread extending in the direction of the thread has a base section adjoining or located in the cylindrical portion and an end section radially adjoining the base section.

In the present invention, this screw joint is characterized in that, within at least a part of the course of the thread, at least the end section of the at least one raised portion is made of a material that is more elastic than the material of the cylindrical portion.

The screw joint of the present invention comprises at least one screw joint member formed with a substantially cylindrical portion provided with a thread (inner or outer thread). The thread may be seen as a raised portion of, in particular, triangular cross section formed helically along the cylindrical portion so that adjacent windings of raised portions are obtained and the entire thread extends along an imaginary axis (extension of the thread). The raised portion comprises a base section adjoining the cylindrical portion and an end section adjoining the former. The end section is made, in particular, of a plastic material that is more elastic than the material of the cylindrical portion of the at least one connection member. The thread does not necessarily have to be made of this material over its entire length in the end section of the raised portion; rather, it will suffice that only in a portion of the thread extension the end sections of the raised portion windings within this portion of the thread are made of this material.

When such a screw joint member (in particular of plastic material) is engaged with a matching screw joint member, this matching screw joint member may be made entirely of less elastic and, thus, harder material than the material the end section of the at least one raised portion of the screw joint member is made of in at least a portion of its extension. Since at least portions of the thread of the present screw joint member is made of a "hard" plastic material and is thus able to accommodate the mechanical forces acting when the member is engaged, for example, with a metal counter screw joint member, the requirements regarding the mechanical stability of the screw joint are met by the present screw joint member. Due to the special design provided by the present invention in at least one other portion of the thread in which the more elastic material is used, the requirements regarding the sealing function of the screw joint are satisfied. Specifically, the thread portion including the end section of the raised portion of the thread that is made of more elastic material, is somewhat oversized so that the elastic material is reliably trapped in the windings with a certain pressure and fills the spaces entirely, assisting the fluid-tightness of the screw joint. In this manner, it becomes possible, for example, to make the present screw joint member from a plastic material, such as polysulphone, which is resistant to temperature, hydrolysis and chemicals, polysulphone being a rather hard and not very elastic material. The windings of a portion of the thread are covered with a tougher or more elastic plastic material, such as PEX or EPDM. This plastic material should also be a material resistant to temperature, chemicals and hydrolysis. The counter screw joint member may be made of metal, but it could just as well be of a solid plastic material resistant to temperature, chemicals and hydrolysis.

The two different material sections of the raised portion are in force engagement. This may take the form of a frictional engagement, a form fit or a material engagement. In any case, the connection of the different materials should be secured against rotation.

Further, it may be envisaged that the entire raised portion consists of the more elastic material in at least a part of the thread. Here, the base section of the rased portion does not coincide with he wall of the (hollow) cylindrical portion so that the end section of the raised portion projects radially inward (with an inner thread) or outward (with an outer thread) from the cylindrical portion.

Advantageously, the thread of the screw joint member of the present screw joint is slightly conical, the outer diameter being larger in the area with the more elastic material than in the remaining thread.

As is obvious from the above, the screw joint of the invention has a sealing effect due to the more elastic material provided. Therefore, this material may also be referred to as a "sealing material".

It is possible to snake not only the end section of the raised portion defining the individual windings from the more elastic material, but also the base section. Finally, it may be envisaged to use the sealing material to fill the spaces between the raised portions provided with the sealing material so that the thread of the counter screw joint member "cuts" into this sealing material layer. When engaging two screw joint members, it is feasible to limit the course oft the, screwing by corresponding abutment surfaces on both members. In the present screw joint member it is advantageous to make the respective abutment surface from a material that is more elastic than the material of the cylindrical portion of the screw joint member. In particular, this material also is the sealing material that is also present in parts of the thread. The abutment surface is formed as a radially extending annular surface against which a corresponding abutment surface or end surface of the counter screw joint member presses when both members are fully engaged. Thereby, an additional sealing of the screw joint is obtained in this area.

BRIEF DESCRIPTION OF THE DRAWINGS

The following is a detailed description of embodiments of the invention with reference to the accompanying drawings. In the Figures:

FIG. 1 is a sectional view of the thread of a screw joint member, such as a fitting, showing the portion of the thread made of comparatively hard material, FIG. 2 illustrates the screw joint member of FIG. 1 having its thread portion provided with a tough or more elastic material, FIG. 5 illustrates a screw joint member with an inner thread that is partly covered with a tough or more elastic material, respectively.

DETAILED DESCRIPTION OF PREFERRED EMBODIMENTS

Figure 3:
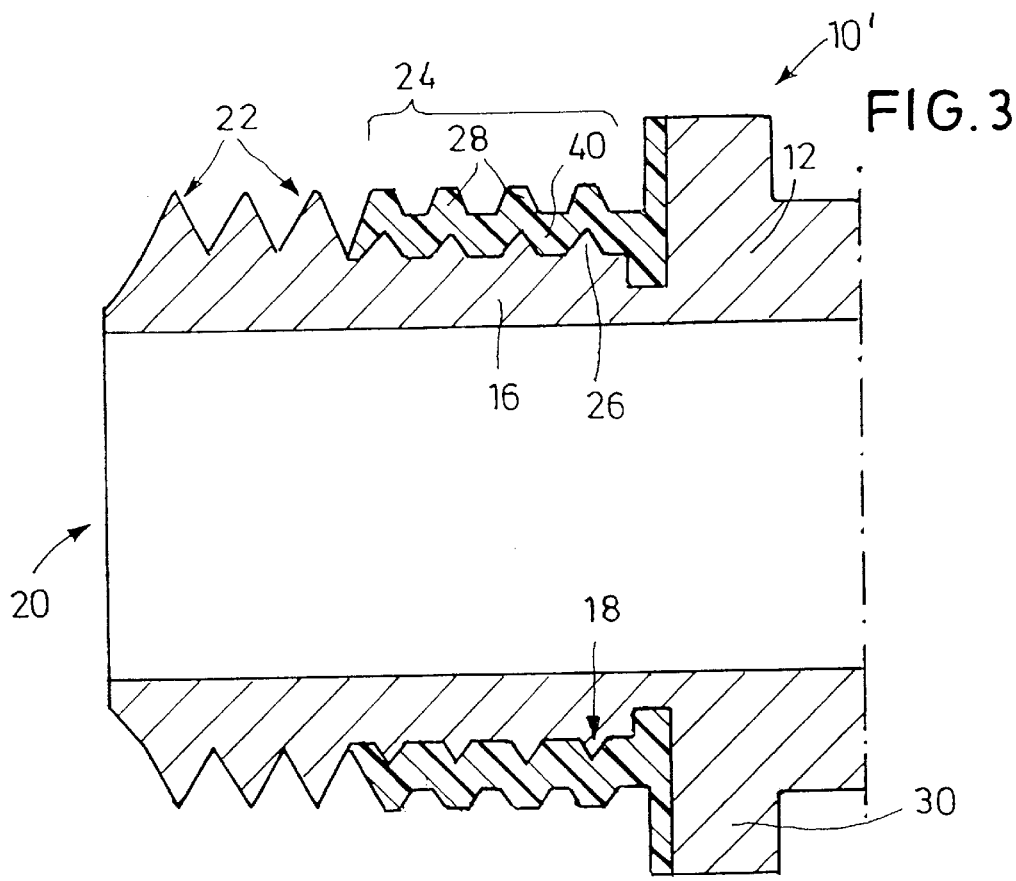
FIG. 3 shows an alternative embodiment of a thread with a portion into which the counter thread may cut, FIG. 4 a further variant of t a thread of a screw joint member with a thread becoming larger in the area where the thread is provided with a more elastic or tougher material, respectively.

FIG. 1 is a longitudinal section through a part of a screw joint member 10 for pipes, which may be, for example, a fitting with a base body 12 of plastic material. FIG. 1, as well as the other Figures, shows that part of the screw joint member 10 or the fitting that has a thread 14. In the embodiment of FIG. 1, this thread is an outer thread formed on the outer surface of a cylindrical portion 16 of the screw joint element 10. The thread 14 has a raised portion or rib 18 of a substantially triangular cross section and extending helically on along the circumference of the cylindrical portion 16, slightly offset with respect to a radial plane. This offset determines the pitch of the thread 14.

As is obvious from FIG. 1, only the windings 22 of the thread that are associated with the free end 20 of the cylindrical portion 16 have raised portions 18 rising to the fill height. In the remaining part 24 of the thread 14, the helical raised portion 18 is of lesser height. This part 24 of the thread is provided only with a base section 26 of the raised portion 18 that adjoins the cylindrical portion 16; in this embodiment, the base section is also triangular in cross section.

The part of the screw joint member represented in FIG. 1 consists of a comparatively hard plastic material resistant to temperature, chemicals and hydrolysis. This material may be, e.g., polysulphone, but a metal may also be used.

As is evident from FIG. 2, the circumferential raised portion 18 is made of two materials in the area of the thread section 24, an end section 28 being disposed on the base section 26 of FIG. 1, the material of the end section being more elastic than that of the base section 26. Specifically, this material is PEX or EPDM. With this material applied, an overall raised portion 18 is obtained that is similar to the one formed in the end part of the thread 14. The material of the end sections 28 of the thread section 24 is applied, for example, by extrusion-coating the screw joint element 10 of FIG. 1.

As is further obvious from FIG. 2, the screw joint element 10 has a radially protruding circumferential collar 30 forming an annular abutment 32 facing the thread. This annular abutment 32 is provided with a layer 34 of sealing material, in particular the material of the end section 28 of the raised portion 18 in the thread section 24.

In FIG. 2, dotted lines indicate the way the screw joint member 10 is screwed into a counter crew joint member 36. This member 36 has an inner thread 38 in engagement with the outer thread 14. The mechanical tension and pressure forces are received by the windings 22 of the thread 14 of the screw joint member 10, whereas the sealing function is obtained through the more elastic material of the raised portion 18 in the thread section 24. The screw joint thus formed satisfies the two main requirements, i.e. mechanical stability, on the one hand, and tightness, on he other hand. This tightness is further improved by the fact that the counter screw joint member 36 abuts the material layer 34 when fully screwed on, whereby sealing is obtained also at this site.

FIG. 3 illustrates an alternative embodiment of the more elastic (sealing) material applied on a part of the thread. The parts of the screw joint member 10' in FIG. 3 corresponding to similar parts in FIG. 2 have been given the same reference numerals. The base body 12 with the cylindrical portion 16 is of the same design as in FIGS. 1 and 2. In the thread section 24, the material forming the end section 28 is applied on the base section 26 of the raised thread portion 18, this material also being provided in the spaces 40 of adjacent windings of the raised portion 18, filling these in part. The thread of counter screw joint member, not illustrated in FIG. 3, cuts into the material in these spaces 40 displacing this material and creating a higher pressure in the overall sealing material, thus increasing the tightness.

Figure 4:
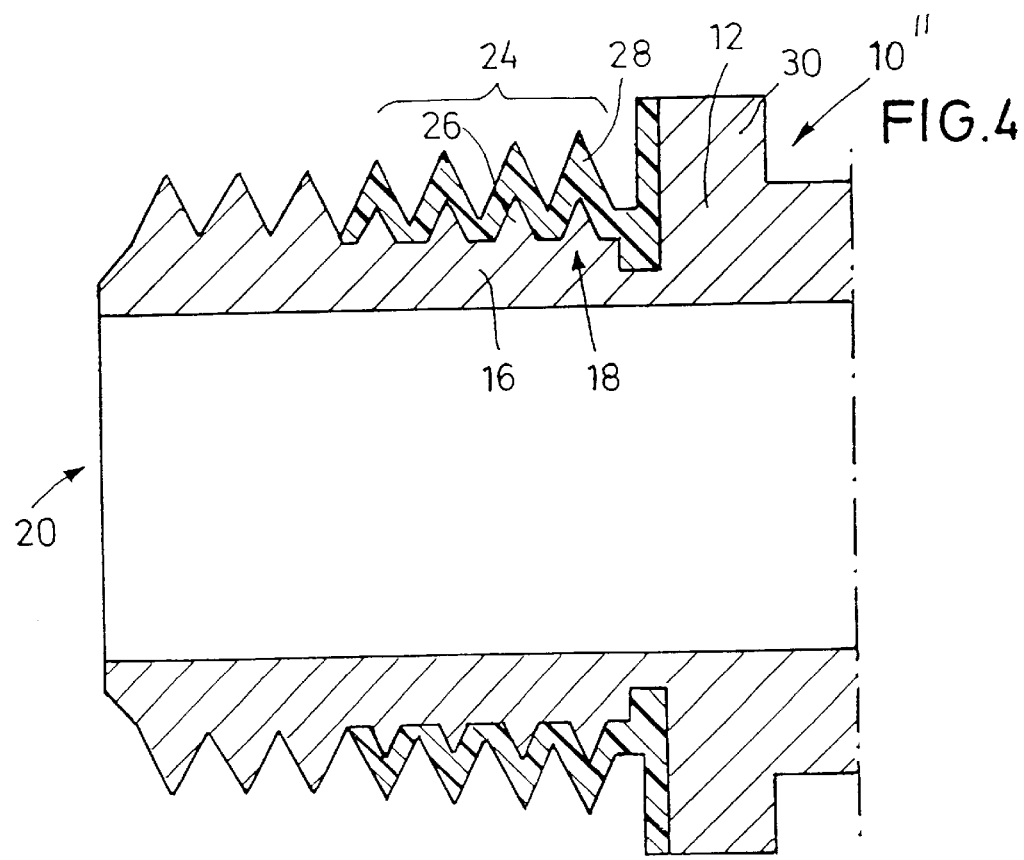

In the embodiment of a screw joint member 10", illustrated in FIG. 4, the same base body 12, as shown in FIGS. 1 to 3, is used. The difference between this screw joint member 10" and the one of FIGS. 2 and 3 is that the height of the raised portion 18 in the thread section 24 increases toward the collar 30. Thus, a thread is obtained that tapers conically toward the free end 20 of the cylindrical portion 16. This also contributes to augmenting the material pressure in the end section 28 of the raised portion 18, thereby increasing the reliability of the sealing of the screw joint.

FIG. 5 finally illustrates a screw joint member 10"' having an inner thread 14' in contrast to the embodiments of FIGS. 1 to 4. As far as the parts of the screw joint member 10"' correspond to or are functionally adequate to those of the screw joint members in FIGS. 1 to 4, they bear the same reference numerals with a single stroke.

The helical raised portion 18' is made from the material of the base body 12', except for the thread section 24' of the cylindrical portion 16' facing the free end 20'. In the thread section 24', the raised portion 18' has a base section 26' formed integrally with the base body 12', which,is adjoined by an end section 28' of a material more elastic than that o the base body 12'. The end face 32' at the free end 20' of the cylindrical portion 16' is provided with a layer 34' of the same material as the end section 26' of the raised portion 18' extending in the thread section 28'. Upon being screwed onto the counter screw joint member 36', illustrated in broken lines in FIG. 5, the windings 22' of the thread 14' serve the mechanical stability of the screw joint, whereas the more elastic material of the end section 28' within the thread section 24' provides the sealing function which is complemented by the material layer 34' against which the counter screw joint member 36' abuts when fully screwed in.

What is claimed is:

1. A screw joint for pipes, in particular for sanitary or heating pipes of plastic material or a composite material of plastic and metal, comprising:

at least one screw joint member having a substantially cylindrical portion, in which a thread with at least one helical raised portion is formed; wherein in at least one axial portion of the thread, the at least one raised portion is made of a material that is more elastic than the material of the cylindrical portion, and in said axial portion of the thread, the at least one raised portion has a base section adjoining the cylindrical portion and projecting therefrom, and an end section radially adjoining the base section, wherein said cylindrical portion and said end section are each comprised of a plastic material, with said end section being comprised of a material that is more elastic than the material of said cylindrical portion.

2. The screw joint of claim 1, wherein the base section of the at least one raised portion is made of a material that is less elastic than the material of the end section.

3. The screw joint of claim 2, wherein the base section of the at least one raised portion is made of the same material as the cylindrical portion.

4. The screw joint of claim 1, wherein the cylindrical portion is made of a plastic material of less elasticity, the end section of the at least one raised portion is made of a softer plastic material.

5. The screw joint of claim 1, wherein in a portion of the thread, the space between adjacent windings are at least partly filled with a material more elastic than the material of the cylindrical portion.

6. The screw joint of claim 5, wherein the material in the space between adjacent windings of the at least one raised portion is the same as the material of the end section of the at least one raised portion.

7. The screw joint of claim 1, wherein the materials of the end section and the base section of the raised portion are in force engagement.

8. The screw joint of claim 7, wherein the materials of the end section and the base section of the raised portion are materially engaged through injected material.

9. The screw joint of claim 7, wherein the materials of the end section and the base section of the raised portion are frictionally engaged and/or form-fit.

10. The screw joint of claim 1, wherein the thread is an outer or an inner thread.

11. The screw joint of claim 1, wherein the height of the raised portion of the thread increases towards the end thereof.

12. The screw joint of claim 1, wherein the screw joint member is provided with abutment for a counter screw joint member to be screwed onto the thread and wherein the abutment is formed by a layer of a material more elastic than the material of the cylindrical portion.

13. The screw joint of claim 12, wherein the material of the layer of the abutment is the same as the material of the end section of the at least one raised portion.

14. The screw joint of claim 1, wherein the cylindrical portion is comprised of the plastic material PSU.

15. The screw joint of claim 1, wherein the end section of the at least one raised portion is comprised of a softer plastic material selected from the group consisting of PEX and EPDM.

16. The screw joint of claim 1, wherein said thread with at least one helical raised portion in said at least one screw joint member having a substantially cylindrical portion is triangular in cross section.

* * * * *